(12) United States Patent
Nakamura et al.

(10) Patent No.: US 9,463,932 B2
(45) Date of Patent: Oct. 11, 2016

(54) CONVEYING APPARATUS

(71) Applicants: Jiro Nakamura, Osaka (JP); Toshihiro Matsuoka, Tokyo (JP)

(72) Inventors: Jiro Nakamura, Osaka (JP); Toshihiro Matsuoka, Tokyo (JP)

(73) Assignee: Daifuku Co., Ltd., Osaka (JP)

( * ) Notice: Subject to any disclaimer, the term of this patent is extended or adjusted under 35 U.S.C. 154(b) by 0 days.

(21) Appl. No.: 14/865,988

(22) Filed: Sep. 25, 2015

(65) Prior Publication Data
US 2016/0009497 A1 Jan. 14, 2016

Related U.S. Application Data

(63) Continuation of application No. PCT/JP2014/051803, filed on Jan. 28, 2014.

(30) Foreign Application Priority Data

Mar. 28, 2013 (JP) .................................. 2013-068460

(51) Int. Cl.
| | |
|---|---|
| B65G 35/06 | (2006.01) |
| B61B 10/04 | (2006.01) |
| B65G 17/12 | (2006.01) |
| B61B 13/12 | (2006.01) |
| B65G 49/04 | (2006.01) |

(52) U.S. Cl.
CPC .............. *B65G 17/12* (2013.01); *B61B 10/04* (2013.01); *B61B 13/125* (2013.01); *B65G 35/06* (2013.01); *B65G 49/045* (2013.01)

(58) Field of Classification Search
CPC ...... B65G 35/06; B61B 10/04; B31B 10/064
See application file for complete search history.

(56) References Cited

U.S. PATENT DOCUMENTS

| | | | | |
|---|---|---|---|---|
| 4,438,701 A * | 3/1984 | Murai | ..................... | B61B 10/04 104/140 |
| 4,440,090 A * | 4/1984 | Murai | ....................... | E04H 6/36 104/127 |
| 5,033,394 A * | 7/1991 | Summa | ................... | B61B 10/04 104/106 |
| 5,303,655 A * | 4/1994 | Summa | ................... | E01B 25/10 104/140 |
| 5,544,590 A * | 8/1996 | Summa | ................... | B61B 10/04 104/130.09 |
| 6,814,218 B2 * | 11/2004 | Nishihara | .............. | B65G 35/06 198/370.04 |
| 7,484,616 B2 * | 2/2009 | Nakamura | .............. | B61B 10/02 104/172.2 |
| 8,602,203 B2 * | 12/2013 | Nishihara | ............ | B65G 35/066 104/172.3 |
| 8,627,942 B2 * | 1/2014 | Terazawa | ............... | B62D 65/04 104/172.2 |

FOREIGN PATENT DOCUMENTS

| | | | | |
|---|---|---|---|---|
| JP | H101046 A | | 1/1998 | |
| JP | 2001225746 A | * | 2/2000 | ............ B61D 17/20 |
| JP | 2001253341 A | * | 3/2000 | ............ B61B 13/12 |
| JP | 3405073 B2 | * | 10/2000 | ............ B61B 13/06 |
| JP | 2001225746 A | | 8/2001 | |
| JP | 2001253341 A | | 9/2001 | |
| JP | 2013184522 A | | 9/2013 | |

* cited by examiner

*Primary Examiner* — Thomas Randazzo
(74) *Attorney, Agent, or Firm* — St. Onge Steward Johnston & Reens LLC (57) ABSTRACT

A conveying apparatus has a conveying traveling body traveling below a floor board and supporting a carriage main body by column portions penetrating a slit provided in the floor board. The conveying traveling body is composed of a plurality of trolleys. A load bar couples the trolleys, and a strip cover plate covers the load bar below the slit. The strip cover plate has a length longer than the conveying traveling body and has one end portion in the traveling direction provided with a movable plate portion higher than the other end portion. The movable plate is pivotally supported so as to be swingable upward from a horizontal posture.

4 Claims, 10 Drawing Sheets

FIG. 10B ness of such configuration, foreign matter is likely to drop from on the floor board to the traveling route of the conveying traveling body under the floor through the slit formed in the floor board. To solve this problem, a strip cover plate for covering the load bar below the slit arranged over the load bar has been considered, as described in Patent Document 1.

CONVEYING APPARATUS

FIELD OF THE INVENTION

The present invention relates to a conveying apparatus in which a carriage main body supporting a conveyed object and being capable of traveling on a floor board is supported by drive travel by a conveying traveling body traveling below the floor board.

BACKGROUND OF THE INVENTION

This kind of conveying apparatus is such that the carriage main body capable of traveling on the floor board is supported by the conveying traveling body traveling below the floor board, via at least a front and a rear column portion vertically penetrating a slit formed in the floor board, and the conveying traveling body is composed of a plurality of trolleys in the traveling direction and a load bar coupling these trolleys together, as described in Patent Document 1 (Japanese unexamined patent application publication No. 2001-253341). In the conveying apparatus of such configuration, foreign matter is likely to drop from on the floor board to the traveling route of the conveying traveling body under the floor through the slit formed in the floor board. To solve this problem, a strip cover plate for covering the load bar below the slit arranged over the load bar has been considered, as described in Patent Document 1.

SUMMARY OF THE INVENTION

Under circumstances where front and rear adjacent conveying traveling bodies travel horizontally in a bumper to bumper state that their load bars butt each other, respective strip cover plates of the conveying traveling bodies arranged over the load bars are also adjacent to each other without a large gap. Thus, the foreign matter having dropped from the slit of the floor board under the floor can be prevented from entering into the traveling route of each conveying traveling body by the strip cover plate of each conveying traveling body. In this kind of conveying apparatus, however, there are occasions where the conveying traveling bodies are made to travel while a necessary space is secured between the front and rear conveying traveling bodies, that is, between the load bars, or where rising and falling gradient route portions are incorporated in the traveling route of the conveying traveling body. As measures against the former, the entire length of the strip cover plate is made longer than that of the conveying traveling body (that of the load bar) so that end portions of the strip cover plates of the front and rear conveying traveling bodies overlap each other in a plan view. However, where such measures are taken, the end portions of the strip cover plates overlapping each other as described above are likely to push each other vertically when the conveying traveling bodies travel an entrance and an exit of the rising and falling gradient route portions as described above. Accordingly, when the rising and falling gradient route portions are incorporated in the traveling route of the conveying traveling body, it is not possible that the entire length of the strip cover plate is made longer than that of the conveying traveling body (that of the load bar) so as to overlap the end portions of the strip cover plates of the front and rear conveying traveling bodies to each other in a plan view as described above. In other words, the foreign matter having dropped from the slit of the floor board under the floor cannot be completely prevented from entering into the traveling route of the conveying traveling body when the respective conveying traveling bodies are made to travel while the necessary space is secured between the front and rear conveying traveling bodies.

The present invention proposes a conveying apparatus capable of solving the foregoing conventional problems. Described by giving reference symbols in parentheses used in the description of an embodiment described later in order to facilitate understanding the relationship with the embodiment, the conveying apparatus of the present invention is the one configured such that a carriage main body (3) capable of traveling on a floor board (2) is supported by a conveying traveling body (4) traveling below the floor board (2), via at least a front and a rear column portion (8a, 8b) vertically penetrating a slit (2a) formed in the floor board (2), and the conveying traveling body (4) is composed of a plurality of trolleys (6a to 7b) in a traveling direction and a load bar (5) coupling these trolleys (6a to 7b), and a strip cover plate (32) for covering the load bar (5) below the slit (2a) is arranged over the load bar (5), characterized in that the strip cover plate (32) has an entire length longer than that of the conveying traveling body (4), and has one end side in the traveling direction of the strip cover plate (32) provided with a movable plate portion (38b) being higher than the other end portion in the traveling direction of the strip cover plate (32) and pivotally supported so as to be swingable upward from a horizontal posture, and the movable plate portion (38b) is overlapped on the one end portion of the strip cover plate (32) when front and rear conveying traveling bodies (4) come close to each other.

With the foregoing configuration of the present invention, the conveying traveling bodies can be made to travel while securing a space between the front and rear conveying traveling bodies within the range where the end portions of the strip cover plates of the front and rear conveying traveling bodies, that is, the front end portion which is lower of the rear-side strip cover plate and the movable plate portion which is higher at the rear end side of the front-side strip cover plate, are overlapped each other in a plan view. Therefore, in this state, the foreign matter having dropped from the floor board through the slit can be reliably prevented from entering into the traveling route of the conveying traveling body by each strip cover plate. As a matter of course, traveling in the state that the load bars of the respective conveying traveling bodies butt each other is also possible only by making an overlapping allowance between the front and rear strip cover plates longer. When the conveying traveling bodies travel and pass through the rising and falling gradient route portions, an unreasonable force does not act between the mutually overlapping end portions of the strip cover plates due to upward escape of the movable plate portion even when facing a situation where the one end portion of the strip cover plate on one of the front and rear adjacent conveying traveling bodies abuts in such a manner so as to push up from below the other end portion of the strip cover plate on the other conveying traveling body either when the conveying traveling body enters into the rising and falling gradient route portions or when the conveying traveling body leaves the rising and falling gradient route portions, since the other end portion of the strip cover plate is constructed by the movable plate portion. Accordingly, the front and rear adjacent conveying traveling bodies can travel and pass through the rising and falling gradient route portions smoothly without unreasonable vertical pushing between the mutually overlapping strip cover plates.

The strip cover plate (32) can be composed of three strip cover plate units (33a to 33c) in the traveling direction divided in positions of the front and the rear column portion (8a, 8b). The load bar (5) can be composed of a central load bar unit (18), a front and a rear intermediate load bar unit (21, 22) coupled to a front and a rear end of the central load bar unit (18) via horizontal swing joint portions (19a, 19b) and vertical swing joint portions (20a, 20b), and front- and rear-end load bar units (24, 25) coupled to free ends of the front and the rear intermediate load bar unit (21, 22) via horizontal swing joint portions (23a, 23b) only. The trolleys can consist of a front and a rear load trolley (6a, 6b) supporting coupling points between the central load bar unit (18) and the front and the rear intermediate load bar unit (21, 22), and front- and rear-end guide trolleys (7a, 7b) integrated with the front- and rear-end load bar units (24, 25). The strip cover plate units (33a, 33c) at both front and rear ends of the strip cover plate units (33a to 33c) can be supported on the front and the rear intermediate load bar unit (21, 22). With this configuration, the load bar itself is composed of five load bar units, but relatively vertically swingable load bar units are three in number. The strip cover plate only needs to be divided into three as well accordingly. Thus, the structure is simplified. On the other hand, a difference in angle between both end portions of the strip cover plate and tangent lines of the rising and falling gradient route portions in these positions when traveling and passing through the rising and falling gradient route portions becomes significantly large, and the end portion of the strip cover plate placed on the upper side and the end portion of the strip cover plate placed on the lower side greatly interfere with each other in the overlapping place between the end portions of the strip cover plates of the front and rear conveying traveling bodies. However, with the present invention, the end portion of the strip cover plate placed on the upper side, that is, the movable plate portion, is pushed upward by the one end portion of the strip cover plate placed on the lower side and escapes. Thus, traveling and passing through the rising and falling gradient route portions can be performed without hindrance.

When the three strip cover plate units (33a to 33c) in the traveling direction constitute the strip cover plate (32) as described above, the strip cover plate unit (33b) in the center of the three strip cover plate units can be supported by the carriage main body (3) on the floor board (2) via a support member (34a, 34b) vertically penetrating the slit (2a).

The end portion of the strip cover plate placed on the lower side, that is, the foregoing one end portion, can have an upper surface laid with a longitudinal rod member (37) parallel to the traveling direction in the overlapping place between the end portions of the strip cover plates of the front and rear conveying traveling bodies (4), when the conveying traveling bodies (4) travel and pass through the rising and falling gradient route portions (DL, UL). With this configuration, not only can the end portion of the strip cover plate be placed on the lower side, which the end portion pushes up the movable plate portion at the end portion of the strip cover plate placed on the upper side, reinforced by the rod member to improve the vertical bending strength, but also the distal end of the movable plate portion at the end portion of the strip cover plate placed on the upper side relatively slide-contacts on the rod member in the traveling direction, so that the sliding-contact between the upper-side movable plate portion and the lower-side end portion of the strip cover plate is smoothly performed as compared to the case where the rod member is not laid.

Furthermore, the movable plate portion (38b) of the strip cover plate (32) can have a distal end whose underside is attached with a transverse rod member (43) in parallel with a right-left width direction of the movable plate portion (38b). With this configuration, not only is the distal end of the movable plate portion reinforced by the transverse rod member, but also the transverse rod member slide-contacts on the one end portion of the strip cover plate placed on the lower side when the conveying traveling bodies travel and pass through the rising and falling gradient route portions, so that the overlapping and sliding-contact movement between the end portions of the strip cover plates can be performed smoothly. In particular, combined with the configuration that the longitudinal rod member is laid on the one end portion of the strip cover plate placed on the lower side, the foregoing configuration can further improve the effect.

DETAILED DESCRIPTION OF THE INVENTION

An overall configuration of the conveying apparatus being the subject matter of the present invention will be described based on FIG. 1. This conveying apparatus 1 is composed of a carriage main body 3 traveling on a floor board 2 and a conveying traveling body 4 traveling below the floor board 2. The conveying traveling body 4 is constituted by a load bar 5 longer than the entire length of a conveyed object W supported by the carriage main body 3, a front and a rear load trolley 6a, 6b supporting a front and a rear place on the center side of the load bar 5, and a front and a rear guide trolley 7a, 7b supporting a front and a rear end portion of the load bar 5. The carriage main body 3 on which the conveyed object W is loaded has a front and a rear place respectively supported by the conveying traveling body 4 by column portions 8a, 8b. The front and the rear column portion 8a, 8b are mounted on the load bar 5 or directly supported by the front and the rear load trolley 6a, 6b while vertically penetrating the load bar 5. Each of the four trolleys 6a to 7b is movably supported on a guide rail 9 constituting the traveling route of the conveying traveling body 4. As a matter of course, to allow the conveying traveling body 4 to travel, a slit 2a (see FIG. 5C) through which the front and the rear column portion 8a, 8b supporting the carriage main body 3 are vertically penetrated is provided to the floor board 2 along the traveling route of the conveying traveling body 4.

Figure 1A:
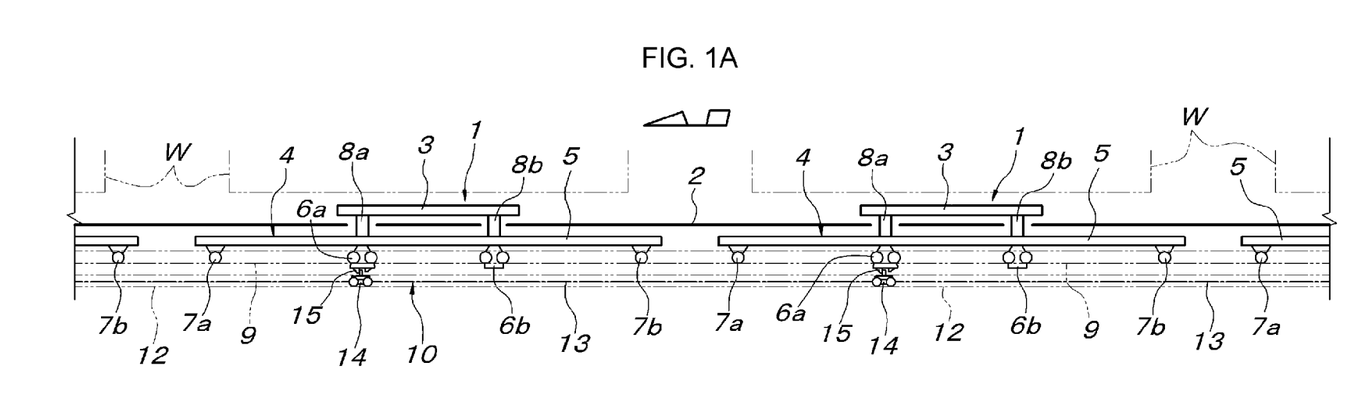
FIG. 1A is a schematic side view explaining a chain conveyor drive conveying apparatus and FIG. 1B is a schematic side view explaining a friction drive conveying apparatus.
Figure 1B:
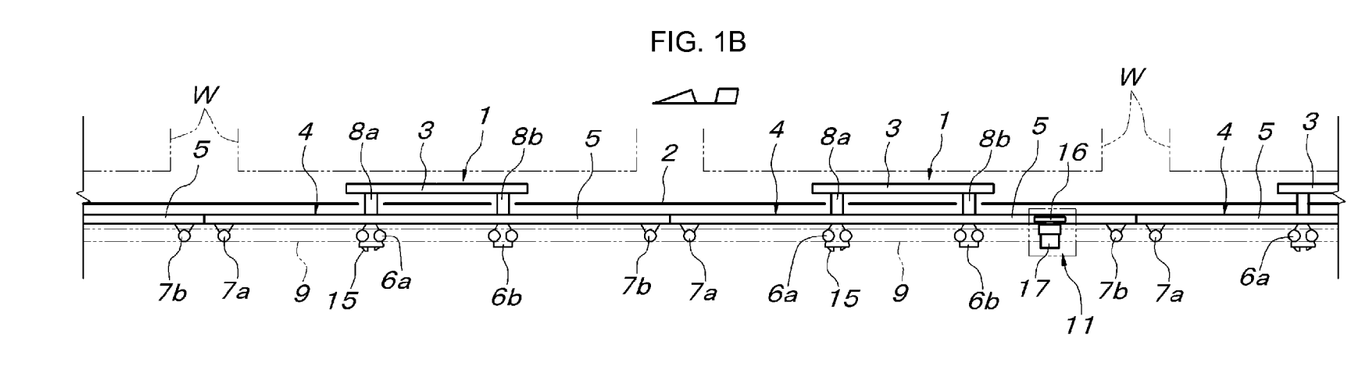

As a drive means for making the conveying traveling body 4 travel, a chain conveyor drive type that uses a chain conveyor 10 shown in FIG. 1A and a friction drive type that uses a friction drive means 11 shown in FIG. 1B are known. The chain conveyor 10 used in the chain conveyor drive type is composed of a conveyor chain 13 which is guided by a guide rail 12 arranged under the guide rail 9 supporting and guiding the respective trolleys 6a to 7b of the conveying traveling body 4 and moves along the guide rail 9, and pusher-equipped trolleys 14 provided to the conveyor chain 13 at regular intervals. The pusher protruded upward from the pusher-equipped trolley 14 is engaged with a driven dog 15 (see FIG. 2B) provided to the front-side load trolley 6a of the conveying traveling body 4, thereby making the conveying traveling body 4 travel forward at a constant speed. With the chain conveyor drive type that uses this chain conveyor 10, the position of each conveying traveling body 4 is determined by the interval between the pusher-equipped trolleys 14 as shown in FIG. 1A. Therefore, the conveying traveling bodies 4 can be positioned at fixed regular intervals so as to form a necessary space between front and rear conveying traveling bodies 4 and driven to travel. Various types of chain conveyors conventionally known can be used as the chain conveyor 10.

Figure 5A:
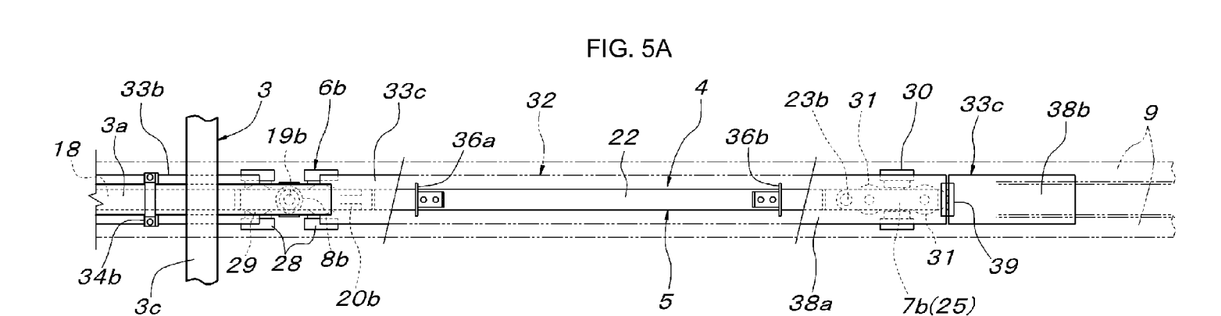
FIG. 5A is an enlarged plan view of a rear half of FIG. 2A.
Figures 5B, 5C:
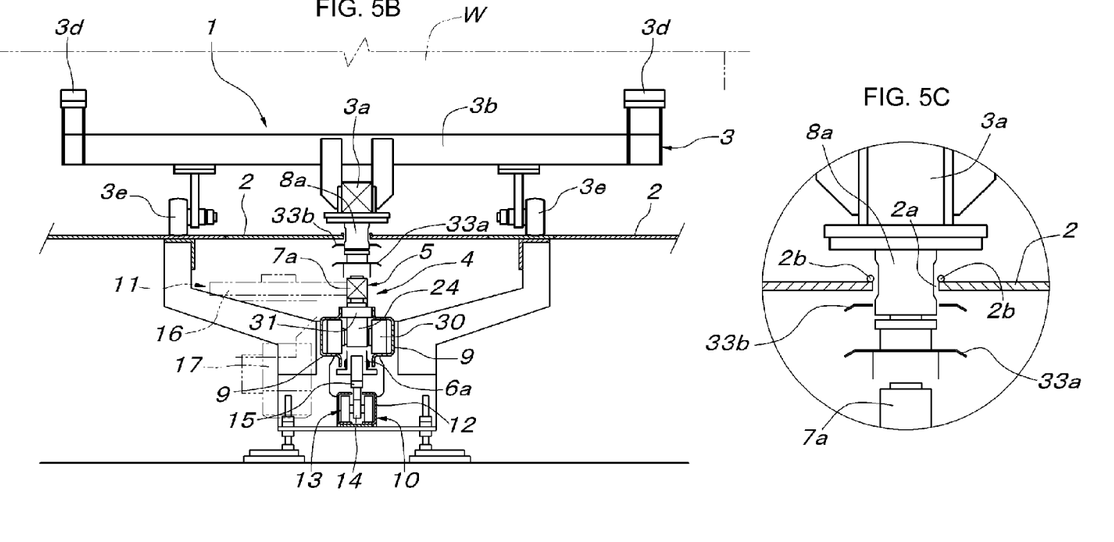
FIG. 5B is a partial longitudinal sectional front view of the conveying apparatus.
FIG. 5C is an enlarged view of a part of FIG. 5B.

As shown by phantom lines of FIG. 1B and FIG. 5B, a friction drive means 11 used in the friction drive type includes a friction drive wheel 16 pressure-contacted with a lateral surface of the load bar 5 having a length corresponding to the entire length of the conveying traveling body 4 and having a lateral surface continuing over the entire length, and a motor 17 rotationally driving the friction drive wheel 16. By arranging the friction drive wheels 16 at an interval shorter than the entire length of the load bar 5, the conveying traveling bodies 4 can be positioned at fixed regular intervals and driven to travel in the same manner as that of the chain conveyor drive type. Only a conveying traveling body 4 sent into the entrance of a specific section is propelled by a friction drive means 11 arranged at the entrance of the specific section, thereby making it possible to drive all of the conveying traveling bodies 4 within the specific section to travel while being pushed by the conveying traveling bodies 4 on the rear side. As the friction drive means 11, various types of conventionally known ones can be used such as the one having a backup roller sandwiching the load bar 5 with the friction drive wheel 16.

The structure of the conveying traveling body 4 will be described in more detail based on FIGS. 2 to 5. The load bar 5 consists of five load bar units, a central load bar unit 18 located between the front and the rear column portion 8a, 8b supporting the carriage main body 3, a front and a rear intermediate load bar unit 21, 22 coupled to a front and a rear end of the central load bar unit 18 via horizontal swing joint portions 19a, 19b and vertical swing joint portions 20a, 20b, and both front- and rear-end short load bar units 24, 25 respectively coupled to free ends of the intermediate load bar units 21, 22 via horizontal swing joint portions 23a, 23b only. The front and the rear load trolley 6a, 6b are pivotally supported by lower ends of column members 26a, 26b having vertical spindles constituting the horizontal swing joint portions 19a, 19b between the central load bar unit 18 and the intermediate load bar units 21, 22, so as to be swingable about right-left lateral horizontal spindles 27a, 27b. To upper ends of the column members 26a, 26b, the column portions 8a, 8b supporting the carriage main body 3 are continuously provided. Accordingly, in this structure, the column portions 8a, 8b supporting the carriage main body 3 are directly supported by the front and the rear load trolley 6a, 6b. However, both column portions 8a, 8b may be fixed in positions near both front and rear ends of the central load bar unit 18.

The front and the rear load trolley 6a, 6b are conventionally known ones that are provided with a front and a rear pair of left and right supporting wheels 28 and a pair of front and rear steady rest rollers 29, and individually regulated in posture to be constant by the guide rail 9. The front and the rear guide trolley 7a, 7b have a structure integrated with the front- and the rear-end short load bar unit 24, 25, and are constructed by pivotally supporting a pair of left and right supporting wheels 30 and a pair of front and rear steady rest rollers 31 to both front- and rear-end load bar units 24, 25. Therefore, the front and the rear guide trolley 7a, 7b have their postures determined with respect to the guide rail 9 due to being coupled to the front and the rear intermediate load bar unit 21, 22 via the horizontal swing joint portions 23a, 23b only.

The conveying traveling body 4 is provided with a strip cover plate 32 located along the load bar 5 and between the load bar 5 and the floor board 2. This strip cover plate 32 is divided into three strip cover plate units 33a to 33c by the front and the rear column portion 8a, 8b supporting the carriage main body 3. The front-end-side strip cover plate unit 33a is disposed in close proximity to the upper surface of the load bar 5, and the central strip cover plate unit 33b and the rear-end-side strip cover plate unit 33c are disposed at a level higher than the front-end-side strip cover plate unit 33a. The central strip cover plate unit 33b is attached to a bottom portion of the carriage main body 3 by a pair of front and rear support members 34a, 34b, in parallel with the central load bar unit 18. The front-end-side strip cover plate unit 33a is attached over the front-side intermediate load bar unit 21 of the load bar 5 parallelly by a pair of front and rear support members 35a, 35b. The rear-end-side strip cover plate unit 33c is attached over the rear-side intermediate load bar unit 22 of the load bar 5 parallelly by a pair of front and rear support members 36a, 36b. With vertically penetrating the floor board 2, the pair of front and rear support members 34a, 34b attaching the central strip cover plate unit 33b to the carriage main body 3 are formed in a width capable of moving along with the traveling of the conveying traveling body 4 while vertically penetrated through the slit 2a provided in the floor board 2.

Figure 8A:
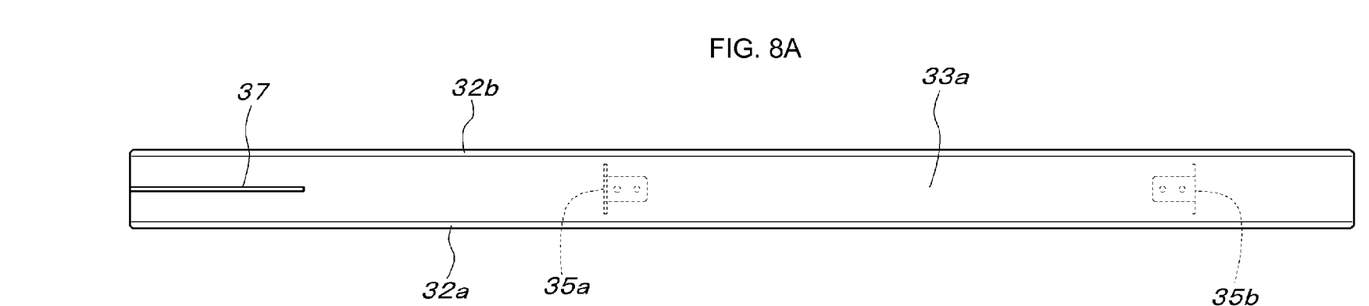
FIG. 8A is a plan view showing a front-end-side strip cover plate unit.
Figure 8B:
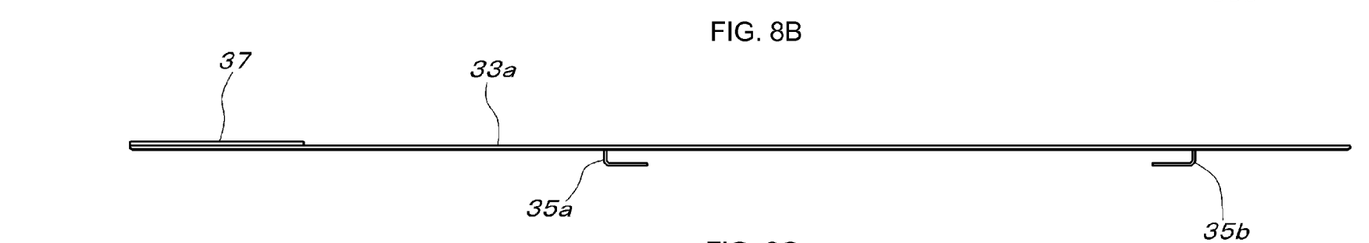
FIG. 8B is a side view of the same.
Figure 8C:
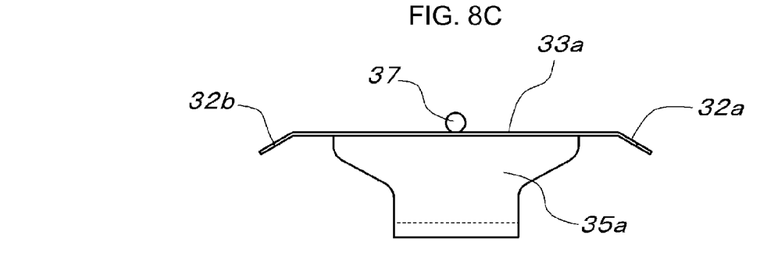
FIG. 8C is an enlarged front view of the same.
Figure 9A:
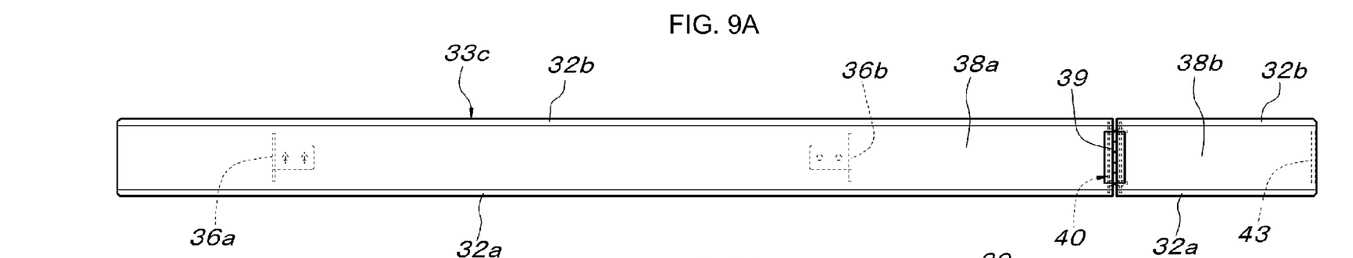
FIG. 9A is a plan view showing a rear-end-side strip cover plate unit.
Figures 9B, 9C:
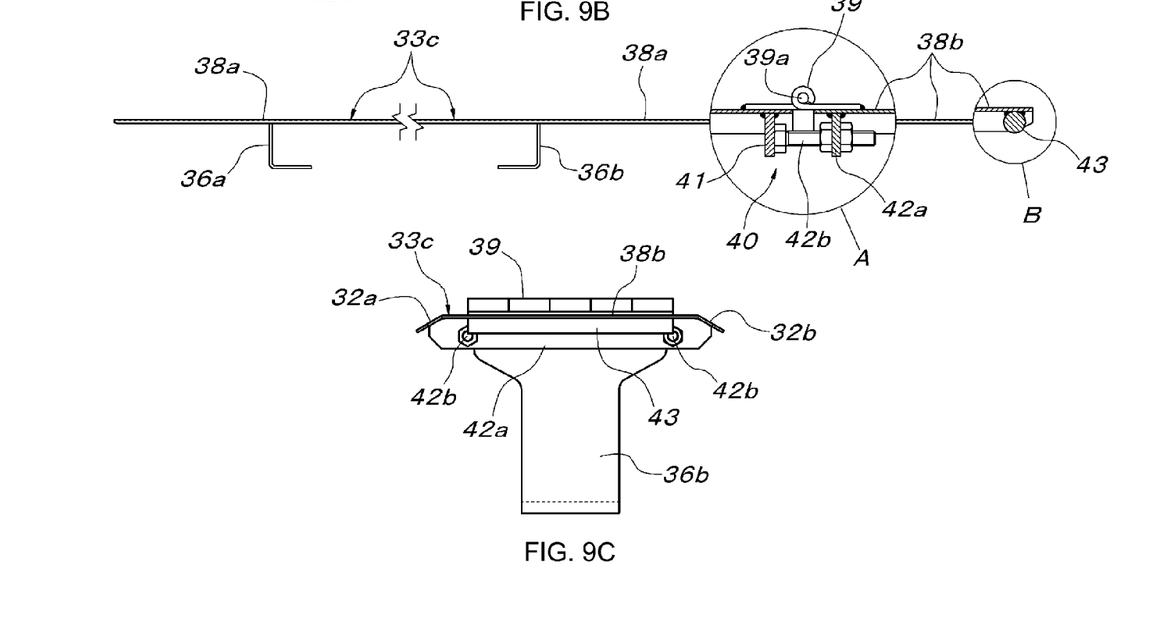
FIG. 9B is a partially cutaway side view including enlarged views of main parts A and B.
FIG. 9C is an enlarged rear view of a rear end portion of the rear-end-side strip cover plate unit.
Figure 10A:
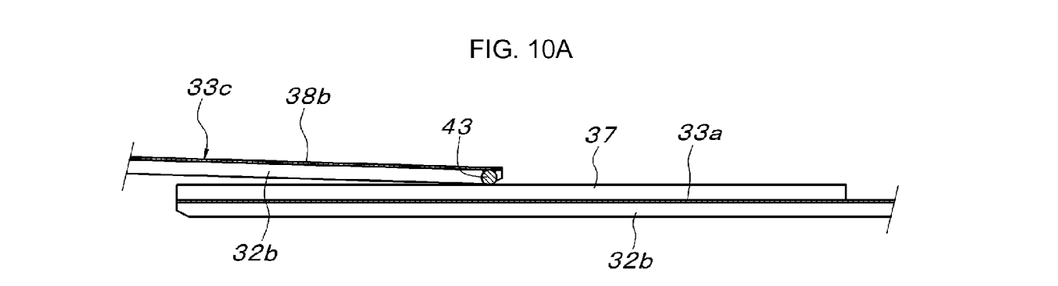
FIG. 10A is a longitudinal sectional side view of a main part showing a state that a movable plate portion of a strip cover plate placed on the upper side abuts on one end portion of a strip cover plate placed on the lower side and FIG. 10B is a longitudinal sectional rear view thereof.
Figure 10B:
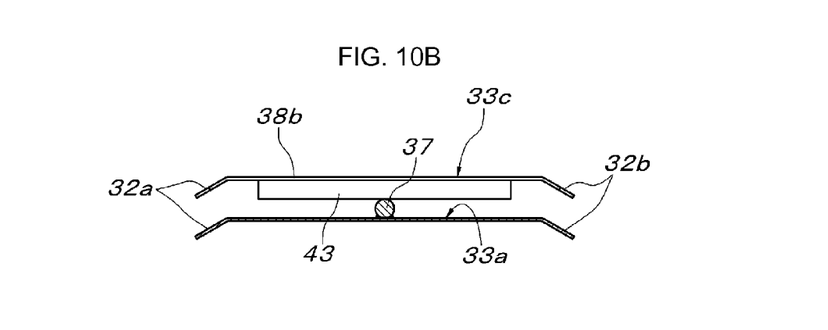

As shown in FIGS. 8 to 10, the three strip cover plate units 33a to 33c of the strip cover plate 32 of the above configuration have their left and right both side faces 32a, 32b bent downward to obtain reinforcing effects and formed such that received foreign matter easily slips down to both left and right sides of the conveying traveling body 4. The strip cover plate 32 has an entire length longer than that of the load bar 5 and extends forward and rearward from both front and rear ends of the load bar 5 by necessary lengths. On an upper surface of a front end portion of the front-end-side strip cover plate unit 33a extending forward from the front end of the load bar 5, a longitudinal rod member 37 using a round bar steel is laid in a central position in the width direction parallel to the traveling direction. The rear-end-side strip cover plate unit 33c is composed of a main body 38a and a movable plate portion 38b extending rearward from the rear end of the load bar 5. This movable plate portion 38b is coupled to a distal end of the main body 38a via a hinge 39 so as to be vertically swingable about a right-left lateral horizontal spindle 39a of the hinge 39, as shown in FIG. 9. A stopper 40 is juxtaposed that prevents the movable plate portion 38b from swinging downward from a horizontal posture that is flush with the main body 38a.

The stopper 40 is composed of a blocking plate 41 fixed on the underside of the distal end of the main body 38a along the width direction, a support plate 42a fixed on the underside of a proximal portion of the movable plate portion 38b along the width direction, and a pair of left and right stopper bolts 42b attached to the support plate 42a so as to be adjustable in attaching position in the direction parallel to the movable plate portion 38b. The pair of left and right stopper bolts 42b are designed to have a distal end (a bolt head portion) abutting against the blocking plate 41 when the movable plate portion 38b is in the horizontal posture that is flush with the main body 38a. Furthermore, a transverse rod member 43 using a round bar steel is fixed on the underside of the distal end of the movable plate portion 38b, in parallel with the width direction.

Figure 4A:
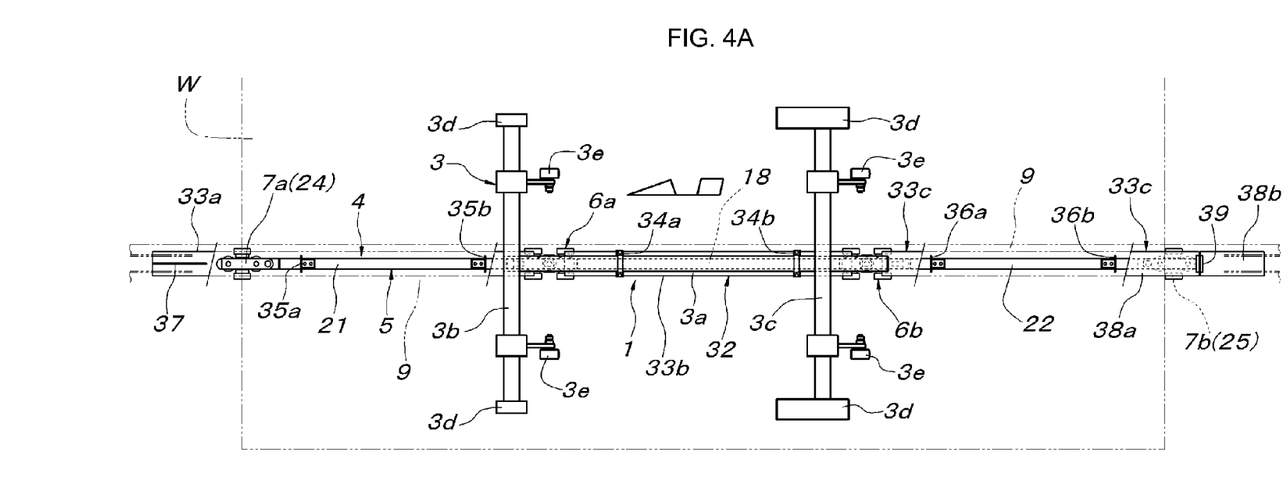
FIG. 4A is a partially cutaway plan view of the conveying apparatus and FIG. 4B is an enlarged plan view of a front half thereof.

The carriage main body 3 having a structure according to a conveyed object W to be loaded is used. In this embodiment, as shown in FIG. 4A and FIG. 5B, the carriage main body 3 has an H planar shape that is parallel to the central load bar unit 18 of the load bar 5 and a pair of front and rear right-left lateral horizontal members 3b, 3c are attached to a central longitudinal member 3a parallel to the central load bar unit 18. A pair of left and right conveyed object support base portions 3d and a pair of left and right supporting horizontal axis rollers 3e rolling on the floor board 2 are provided to each of the pair of front and rear right-left lateral horizontal members 3b, 3c.

Figure 4B:
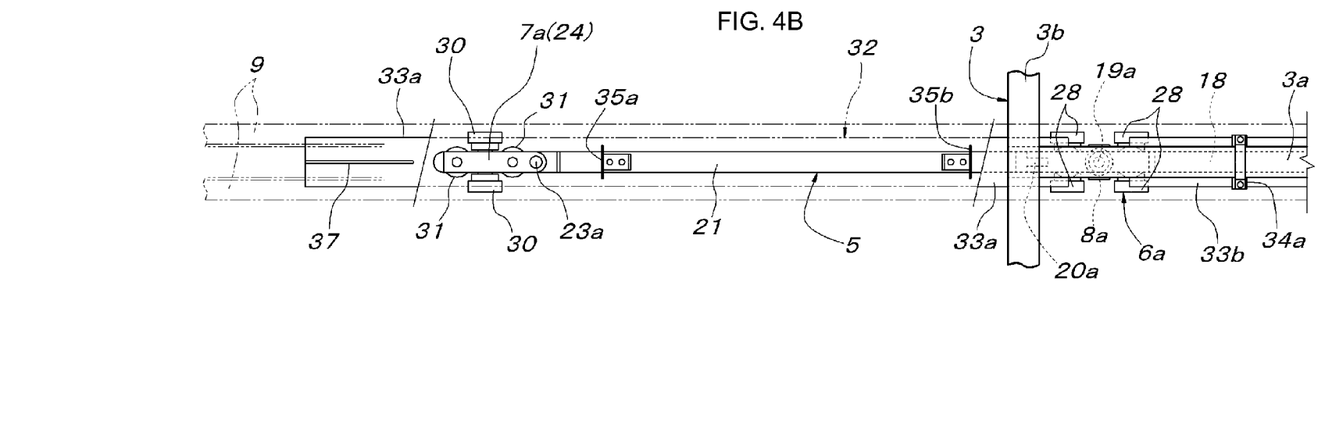

The guide rail 9 supporting and guiding the respective trolleys 6a to 7b of the conveying traveling body 4 is constructed of a pair of left and right channel rail materials individually supporting the left and right supporting wheels 28, 30 of the respective trolleys 6a to 7b, as shown in FIG. 5B. Even where the chain conveyor 10 shown in FIG. 1A is used as a drive means for propelling the conveying traveling body 4, the guide rail 12 supporting and guiding the conveyor chain 13 generally has a width narrower than that of the entire guide rail 9 located immediately above, irrespective of the structure. Thus, in order to prevent foreign matter from entering into the guide rails 9, 12 from above, the right-left lateral width of the strip cover plate 32 covering the entire conveying traveling body 4 only needs to be wider than that of an upper-side opened slit portion between the pair of left and right channel rail materials constituting the guide rail 9, as shown in FIG. 4B, FIG. 5A, and FIG. 5B.

Figure 2A:
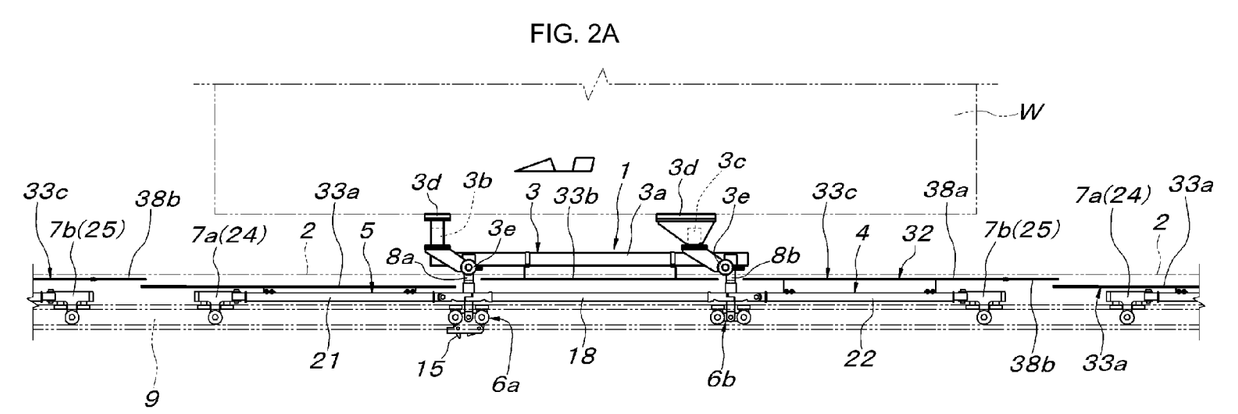
FIG. 2A is a side view of a conveying apparatus showing one embodiment of the present invention and FIG. 2B is an enlarged side view of a front half thereof.
Figure 2B:
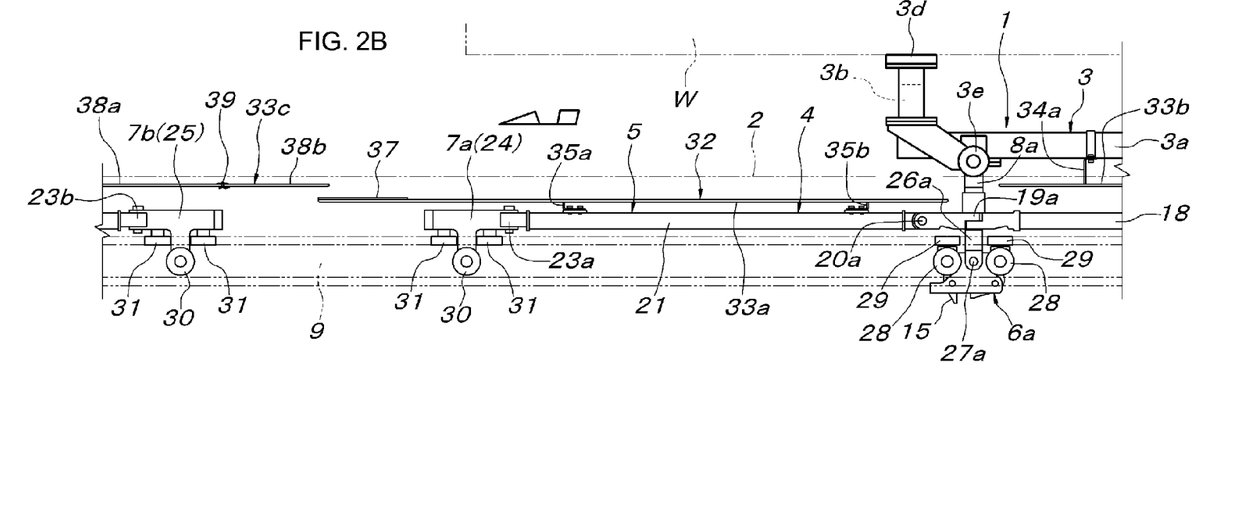
Figure 3:
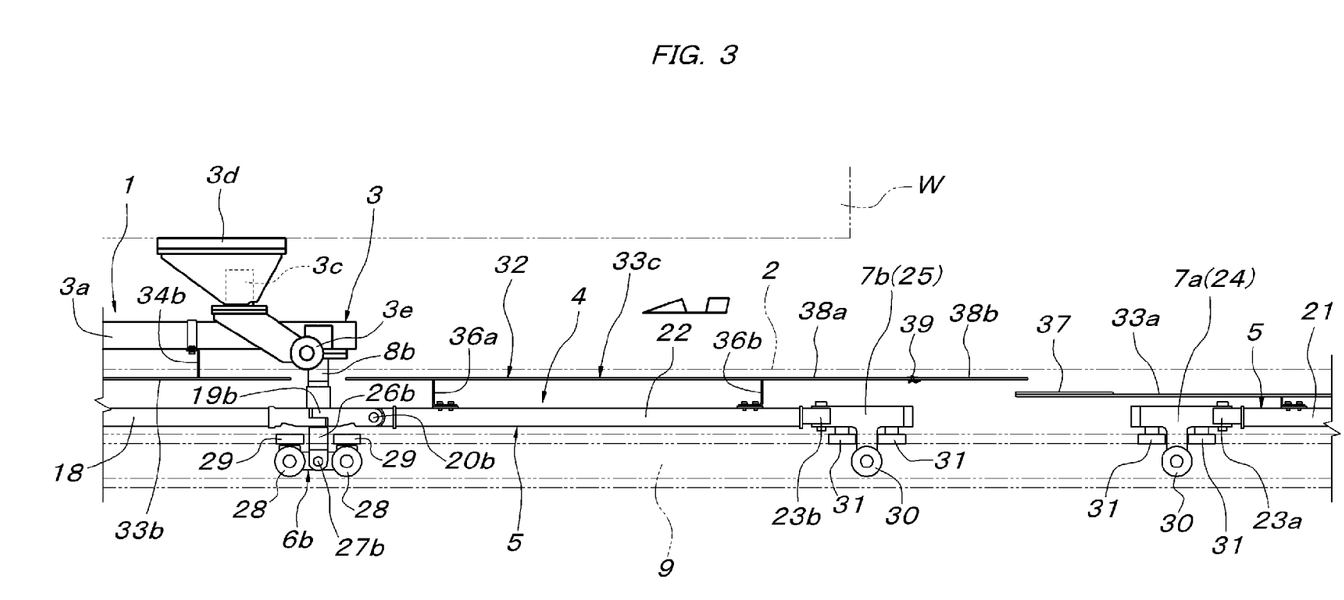
FIG. 3 is an enlarged side view of a rear half of the conveying apparatus.

The conveying apparatus 1 of the present invention configured as above can make the conveying traveling body 4 travel at a constant speed by the chain conveyor 10 shown in FIG. 1A or the friction drive means 11 shown in FIG. 1B, securing a space between front and rear adjacent conveying traveling bodies 4 within the range where the rear end portion of the rear-end-side strip cover plate unit 33c of the strip cover plate 32 of the conveying traveling body 4 on the front side, that is, the rear end portion of the movable plate portion 38b, is overlapped on the front end portion of the front-end-side strip cover plate unit 33a of the strip cover plate 32 of the conveying traveling body 4 on the rear side in a plan view as shown in FIG. 2 and FIG. 3. As a matter of course, the conveying apparatus 1 can make the conveying traveling body 4 travel by the friction drive means 11 shown in FIG. 1B in a pushing state that respective end portions of the load bars 5 of the front and rear adjacent conveying traveling bodies 4, that is, the front-end load bar unit 24 of the load bar of the conveying traveling body 4 on the rear side and the rear-end load bar unit 25 of the load bar of the conveying traveling body 4 on the front side abut against each other. In this case, the front end portion of the front-end-side strip cover plate unit 33a of the strip cover plate 32 of the conveying traveling body 4 on the rear side deeply enters between the rear-end-side strip cover plate unit 33c of the strip cover plate 32 and the guide trolley 7b of the conveying traveling body 4 on the front side. In either case, the foreign matter having dropped under the floor from the slit 2a of the floor board 2 is received by the strip cover plate 32 provided to each conveying traveling body 4 or drops from both left and right side faces 32a, 32b of the strip cover plate 32 to the lateral sides in the area where each conveying traveling body 4 travels, and the possibility of dropping into the upper-side opened slit portion of the guide rail 9 located immediately below the load bar 5 is eliminated. In order to effectively inhibit the dropping of the foreign matter from the slit 2a, a round bar steel 2b, for example, can be laid on the floor side of the left and right both side faces of the slit 2a, as shown in FIG. 5C.

Figure 6:
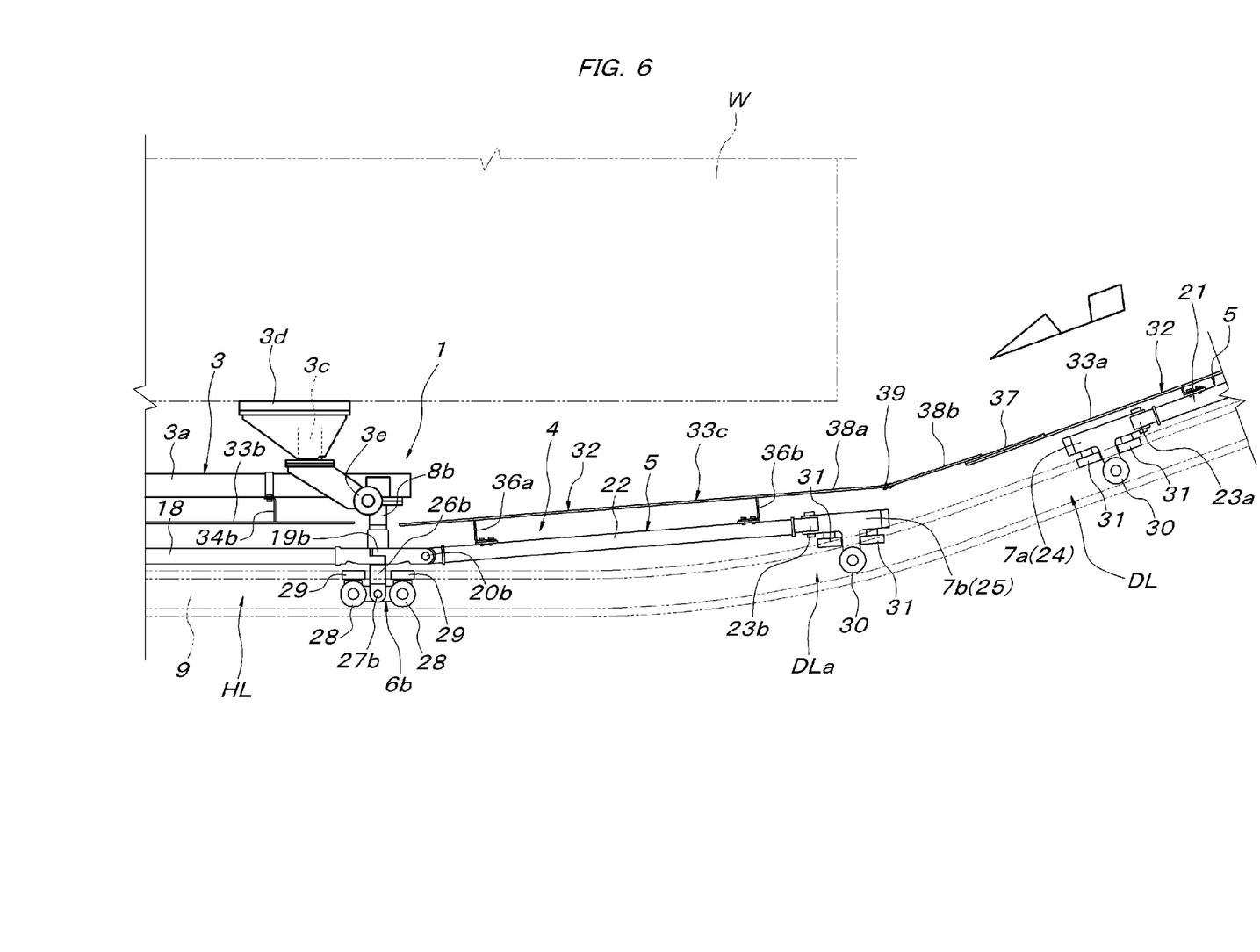
FIG. 6 is a side view of a main part explaining a state between front and rear conveying traveling bodies in a falling gradient route portion.

As shown in FIG. 2 and FIG. 3, a horizontal route portion in which the respective conveying traveling bodies 4 are made to travel at a constant speed while a predetermined space is formed between the front and rear adjacent conveying traveling bodies 4 normally has the floor board 2 laid and is mainly used as a work section for the conveyed object W. Rising and falling gradient route portions are incorporated when the height of the horizontal route portion is changed. In such case, a horizontal route portion HL is connected to a falling gradient route portion DL as shown in FIG. 6. In a curved route portion DLa between the both route portions, the rear end portion of the strip cover plate 32 of the conveying traveling body 4 on the front side, that is, the movable plate portion 38b at the rear end of the rear-end-side strip cover plate unit 33c, largely tilts toward a direction in which the rear end is lowered with respect to the tangential direction of the curved route portion DLa in that position, and crosses the front end portion of the front-end-side strip cover plate unit 33a of the strip cover plate 32 of the conveying traveling body 4 on the rear side having been entered under the movable plate portion 38b in a side view. When the foregoing phenomena occurs, since being capable of swinging upward about the horizontal spindle 39a of the hinge 39, the movable plate portion 38b is received by the front end portion of the front-end-side strip cover plate unit 33a of the strip cover plate 32 of the conveying traveling body 4 on the rear, which the front end portion located below the movable plate portion 38b, and from then on, the movable plate portion 38b swings upward about the horizontal spindle 39a of the hinge 39 relative to the main body 38a of the rear-end-side strip cover plate unit 33c as shown, in such a manner so as to be pushed up by the front end portion of the front-end-side strip cover plate unit 33a located on the lower side. Unreasonable pressure contact is not caused between the movable plate portion 38b and the front end portion of the front-end-side strip cover plate unit 33a located therebelow.

Figure 7:
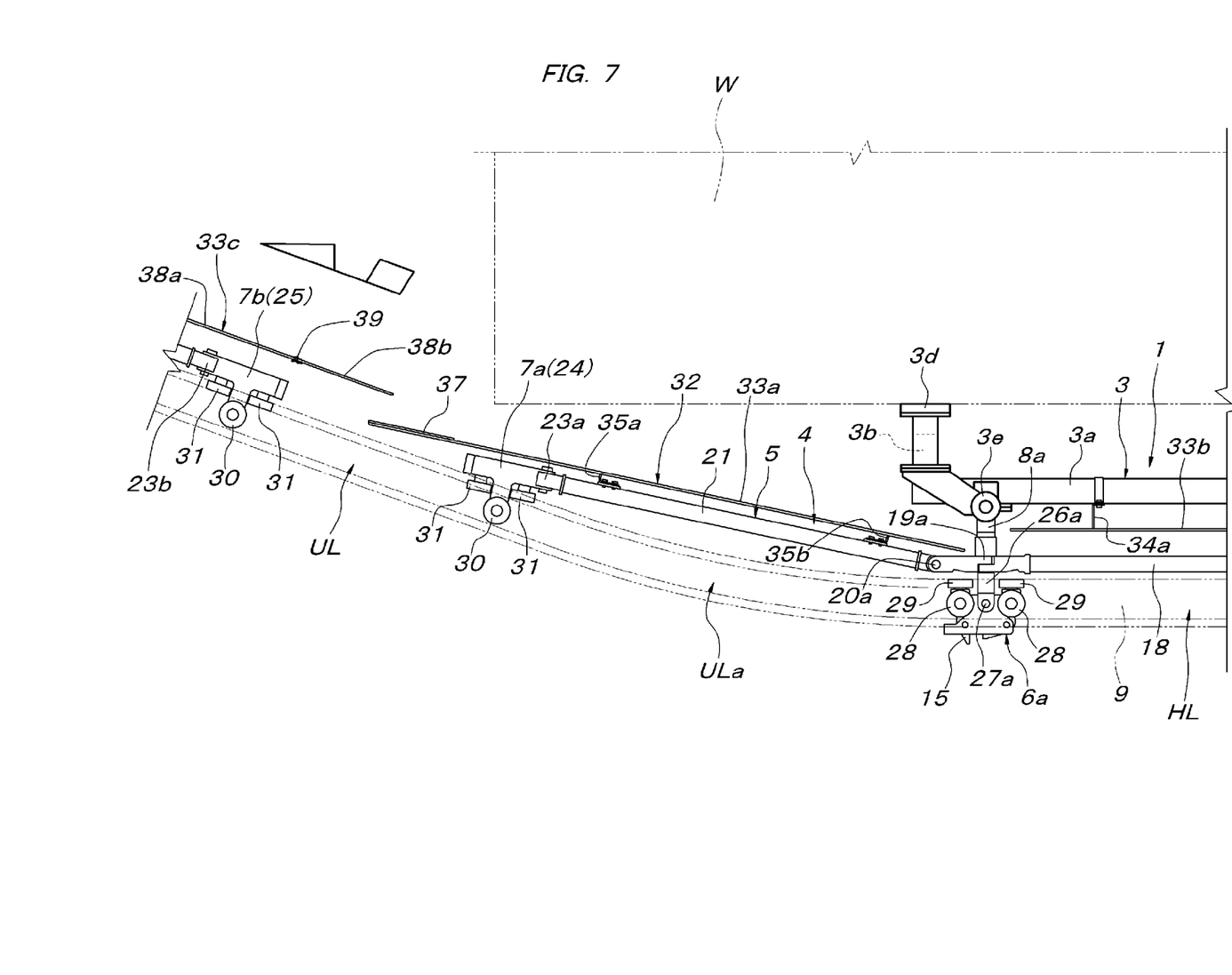
FIG. 7 is a side view of a main part explaining a state between front and rear conveying traveling bodies in a rising gradient route portion.

The conveying traveling body 4 having entered the horizontal route portion HL from the falling gradient route portion DL shown in FIG. 6 moves into a rising gradient route portion UL as shown in FIG. 7 again. When each conveying traveling body 4 travels and passes through a curved route portion ULa between the horizontal route portion HL and the rising gradient route portion UL, the front end portion of the front-end-side strip cover plate unit 33a of the strip cover plate 32 of the conveying traveling body 4 on the rear side is relatively lowered with respect to the rear end portion of the rear-end-side strip cover plate unit 33c of the strip cover plate 32 of the conveying traveling body 4 on the front side. Thus, the rear end portion of the rear-end-side strip cover plate unit 33c of the strip cover plate 32 of the conveying traveling body 4 on the front side, that is, the movable plate portion 38b, continues its traveling while keeping an extended posture of the main body 38a located in front thereof. Although not shown, in a curved route portion extending from the upper end of the rising gradient route portion UL to the upper level horizontal route portion or a curved route portion extending from the upper level horizontal route portion to the falling gradient route portion DL, these curved route portions are curved in a convex shape. Therefore, the overlapping portion between the end portions of the strip cover plates 32 of the front and rear adjacent conveying traveling bodies 4 is only altered in an expanding direction and the movable plate portion 38b does not work, so that the conveying traveling bodies 4 can travel without any problem.

In the foregoing embodiment, the rear end portion of the strip cover plate 32 is made higher than the front end portion and is arranged so as to be overlapped on the front end portion of the strip cover plate 32 of the conveying traveling body 4 on the rear side. Thus, the rear end portion of the strip cover plate 32 placed on the upper side of the overlapping portion is designed to be swingable upward by the movable plate portion 38b. However, to the contrary, when the front end portion of the strip cover plate 32 is made higher than the rear end portion and is arranged so as to be overlapped on the rear end portion of the strip cover plate 32 of the conveying traveling body 4 on the front side, the front end portion of the strip cover plate 32 placed on the upper side of the overlapping portion is designed to be swingable upward by the movable plate portion 38b. When designed like this, the movable plate portion 38b at the front end portion of the strip cover plate 32 is pushed up and swings upward by the rear end portion of the strip cover plate 32 of the conveying traveling body 4 on the front side placed on the lower side, in traveling the curved route portion ULa shifting from the horizontal route portion HL to the rising gradient route portion UL shown in FIG. 7.

In either case, the upper surface of one end portion which is lower of the strip cover plate 32 placed on the lower side and the distal end side of the movable plate portion 38b which is higher of the strip cover plate 32 placed on the upper side abut against each other when the conveying traveling bodies 4 travel the concaved curved route portion. With the configuration of the foregoing embodiment, the transverse rod member 43 on the underside of the distal end side of the upper-side movable plate portion 38b abuts crosswise on the longitudinal rod member 37 laid on the upper surface of one end portion of the lower-side strip cover plate 32, and sliding-contact movement in the traveling direction (the length direction of the longitudinal rod member 37) is involved between the both. Thus, the friction generated between the both is small, and even where coating and/or plating is applied on the upper surface of the strip cover plate 32, the sliding-contact movement is smoothly performed without involving peeling of these coating and/or plating.

The conveying apparatus of the present invention is of a type that supports the carriage main body located above the floor by the conveying traveling body located below the floor to make the carriage main body travel, and can be utilized as a conveying apparatus in which a slit through which column portions supporting the carriage main body move while penetrated is provided in the floor board, and yet, there is no possibility that smooth traveling of the conveying traveling body is interrupted by foreign matter dropping under the floor from the slit.

What is claimed is:

1. A conveying apparatus comprising:
   a carriage main body capable of traveling on a floor board, the carriage main body being supported by a conveying traveling body traveling below the floor board, via at least a front and a rear column portion vertically penetrating a slit formed in the floor board;
   the conveying traveling body being composed of a plurality of trolleys in a traveling direction;
   a load bar coupling the trolleys;
   a strip cover plate for covering the load bar below the silt is arranged over the load bar, the strip cover plate having a length longer than that of the conveying traveling body, and has one end portion in the traveling direction of the strip cover plate provided with a movable plate portion being higher than the other end portion in the traveling direction of the strip cover plate, the movable plate portion being pivotally supported so as to be swingable upward from a horizontal posture, and the moveable plate portion is overlapped on the one end portion of the strip cover plate when front and rear conveying traveling bodies come close to each other, and
   the strip cover plate is composed of three strip cover plate units in the traveling direction divided in positions of the front and the rear column portion, and the load bar is composed of a central load bar unit, a front and a rear intermediate load bar unit coupled to a front and a rear end of the central load bar unit via horizontal swing joint portions and vertical swing joint portions, and front- and rear-end load bar units coupled to free ends of the front and the rear intermediate load bar unit via horizontal swing joint portions only, and the trolleys are composed of a front and a rear load trolley supporting coupling points between the central load bar unit and the front and the rear intermediate load bar unit, and front- and rear-end guide trolleys integrated with the front- and rear-end load bar units, and the strip cover plate units at both front and rear ends of the strip cover plate units are supported on the front and the rear intermediate load bar unit.

2. The conveying apparatus according to claim 1, wherein the strip cover plate unit in the center of the three strip cover plate units in the traveling direction is supported by the carriage main body on the floor board via a support member vertically penetrating the slit.

3. A conveying apparatus comprising:
   a carriage main body capable of traveling on a floor board, the carriage main body being supported by a conveying traveling body traveling below the floor board, via at least a front and a rear column portion vertically penetrating a slit formed in the floor board;
   the conveying traveling body being composed of a plurality of trolleys in a traveling direction;

a load bar coupling the trolleys;

a strip cover plate for covering the load bar below the slit is arranged over the load bar, the strip cover plate having a length longer than that of the conveying traveling body, and has one end portion in the traveling direction of the strip cover plate provided with a moveable plate portion being higher than the other end portion in the traveling direction of the strip cover plate, the moveable plate portion being pivotally supported so as to be swingable upward from a horizontal posture, and the moveable plate portion is overlapped on the one end portion of the strip cover plate when front and rear conveying traveling bodies come close to each other; and the one end portion of the strip cover plate has an upper surface laid with a longitudinal rod member parallel to the traveling direction.

4. A conveying apparatus comprising:

a carriage main body capable of traveling on a floor board, the carriage main body being supported by a conveying traveling body traveling below the floor board, via at least a front and a rear column portion vertically penetrating a slit formed in the floor board;

the conveying traveling body being composed of a plurality of trolleys in a traveling direction;

a load bar coupling the trolleys;

a strip cover plate for covering the load bar below the slit is arranged over the load bar, the strip cover plate having a length longer than that of the conveying traveling body, and has one end portion in the traveling direction of the strip cover plate provided with a moveable plate portion being higher than the other end portion in the traveling direction of the strip cover plate, the moveable plate portion being pivotally supported so as to be swingable upward from a horizontal posture, and the moveable plate portion is overlapped on the one end portion of the strip cover plate when front and rear conveying traveling bodies come close to each other; and the movable plate portion of the strip cover plate has a distal end whose underside is attached with a transverse rod member in parallel with a left-right width direction of the movable plate portion.

\* \* \* \* \*